(12) United States Patent
Viault et al.

(10) Patent No.: US 8,496,383 B2
(45) Date of Patent: Jul. 30, 2013

(54) BUMP STOP AND ASSOCIATED MACPHERSON STRUT

(75) Inventors: Samuel Viault, Tours (FR); Thierry Poulle, Neuvy-le-roi (FR)

(73) Assignee: Aktiebolaget SKF, Göteborg (SE)

( * ) Notice: Subject to any disclaimer, the term of this patent is extended or adjusted under 35 U.S.C. 154(b) by 122 days.

(21) Appl. No.: 13/121,123

(22) PCT Filed: Sep. 23, 2009

(86) PCT No.: PCT/EP2009/062308
§ 371 (c)(1),
(2), (4) Date: Jun. 14, 2011

(87) PCT Pub. No.: WO2010/034734
PCT Pub. Date: Apr. 1, 2010

(65) Prior Publication Data
US 2011/0291337 A1     Dec. 1, 2011

(30) Foreign Application Priority Data
Sep. 26, 2008   (FR) ..................... 08 56495

(51) Int. Cl.
*F16C 19/30* (2006.01)
(52) U.S. Cl.
USPC ........................ 384/617; 267/217

(58) Field of Classification Search
USPC ................. 267/217–220; 384/609–617
See application file for complete search history.

(56) References Cited

U.S. PATENT DOCUMENTS

| | | | |
|---|---|---|---|
| 6,267,512 B1 | 7/2001 | Beghini et al. | |
| 6,767,010 B2* | 7/2004 | Miller et al. | 267/170 |
| 6,814,496 B2 | 11/2004 | Beghini et al. | |
| 2003/0070898 A1* | 4/2003 | Wolbers et al. | 192/98 |
| 2011/0133379 A1* | 6/2011 | Viault et al. | 267/217 |
| 2012/0292841 A1* | 11/2012 | Corbett et al. | 267/217 |

FOREIGN PATENT DOCUMENTS

| | | |
|---|---|---|
| DE | 102007024628 A1 | 12/2007 |
| EP | 1555144 A2 | 7/2005 |
| FR | 2779096 A1 | 12/1999 |
| FR | 2822508 A1 | 9/2002 |
| FR | 2867421 A1 | 9/2005 |
| FR | 2901737 A1 | 12/2007 |
| FR | 2915929 A1 | 11/2008 |

* cited by examiner

*Primary Examiner* — Christopher Schwartz
(74) *Attorney, Agent, or Firm* — Mark A. Ussai; Bryan Peckjian

(57) ABSTRACT

The bump stop device, particularly for a motor vehicle, comprises a bearing 6 forming an axial stop, a bottom support cover 5 of the bearing and a bottom retainer 7 for a spring comprising at least one stiffening strut. The support cover 5 and/or the retainer 7 comprises at least one axial securing means 15 of the bottom retainer and of the bottom support cover, the said means being situated axially set back from a bottom end of the retainer.

9 Claims, 5 Drawing Sheets

BUMP STOP AND ASSOCIATED MACPHERSON STRUT

CROSS REFERENCE TO RELATED APPLICATIONS

This application is the U.S. National Phase Application of PCT/EP2009/062308, filed Sep. 23, 2009, which claims priority to French Patent Application No. 0856495, filed Sep. 26, 2008, the contents of such applications being incorporated by reference herein.

BACKGROUND OF THE INVENTION

The present invention relates to the field of bump stop devices used in particular on motor vehicles in the MacPherson struts of the steering wheels.

Conventionally, a bump stop is provided with a top race and a bottom race between which rolling elements and bottom and top retaining or support elements are placed such as covers, forming housings for the bottom and top races of the bearing respectively.

A bump stop is placed in the top portion of the MacPherson strut between a suspension spring and a top element secured to the bodywork of the vehicle. The suspension spring is placed around a shock absorber piston rod the end of which may be secured to the bodywork of the vehicle. The spring rests axially, directly or indirectly, on the bottom support cover of the bearing.

The bump stop therefore makes it possible to transmit axial forces between the suspension spring and the bodywork of the vehicle while allowing a relative angular movement between the bottom cover, which is movable in rotation, and the top cover. This relative angular movement may originate from a steering action of the steered wheels and/or from the compression of the suspension spring. For further details it is possible, for example, to refer to patent application FR-A1-2 822 508.

Also known from document FR-A1-2 901 737, is a bump stop provided with a support cover, a bearing mounted on the support cover and a subassembly for filtering the vibrations and for distributing stresses mounted against the support cover and comprising a vibration-filtering element as well as a stiffening strut mounted against this filtering element.

So as to allow the subassembly to be held on the support cover, the latter comprises a plurality of tongues forming stops interacting axially with the bottom end of said subassembly in the event of relative axial movement.

Such a solution may have certain disadvantages. Specifically, there is usually an axial clearance between the bottom end of the subassembly and the tongues of the support cover, which may cause slight relative axial movements between these two elements. In addition, it is necessary to provide a support cover with a relatively large axial dimension in order to allow the tongues to pass axially under the bottom end of the subassembly for filtering the vibrations and distributing the stresses.

SUMMARY OF THE INVENTION

The object of the present invention is therefore to remedy these disadvantages.

More particularly, the object of the present invention is to provide a bump stop device which is relatively economical, simple to install and has a good operating safety.

In one embodiment, the bump stop device, particularly for a motor vehicle, comprises a bearing forming an axial stop, a bottom support cover of the bearing and a bottom retainer for a spring comprising at least one stiffening strut. The support cover and/or the retainer comprises at least one axial securing means of the bottom retainer and of the bottom support cover, the said means being situated axially set back from a bottom end of the retainer.

The axial securing means may comprise at least one protrusion extending radially.

In one embodiment, the support cover comprises elastic means coming radially into contact with a bore of the bottom retainer. Advantageously, the elastic means have, in the free state, a diameter that is greater than the diameter of the bore of the bottom retainer. The elastic means preferably extend obliquely in the direction of the bottom end of the retainer.

In one embodiment, the retainer comprises lugs coming radially into contact with an external axial surface of the bottom support cover.

Preferably, the bottom support cover comprises a body made of synthetic material.

The bottom retainer may comprise the stiffening strut and a vibration-filtering element.

In one embodiment, a MacPherson strut comprises a shock absorber and a bump stop device as defined above. A motor vehicle may also comprise at least one such MacPherson strut.

BRIEF DESCRIPTION OF THE SEVERAL VIEWS OF THE DRAWINGS

The present invention will be better understood on reading the detailed description of embodiments taken as examples that are in no way limiting and illustrated by the appended drawings in which.

DETAILED DESCRIPTION OF THE INVENTION

Figure 1:
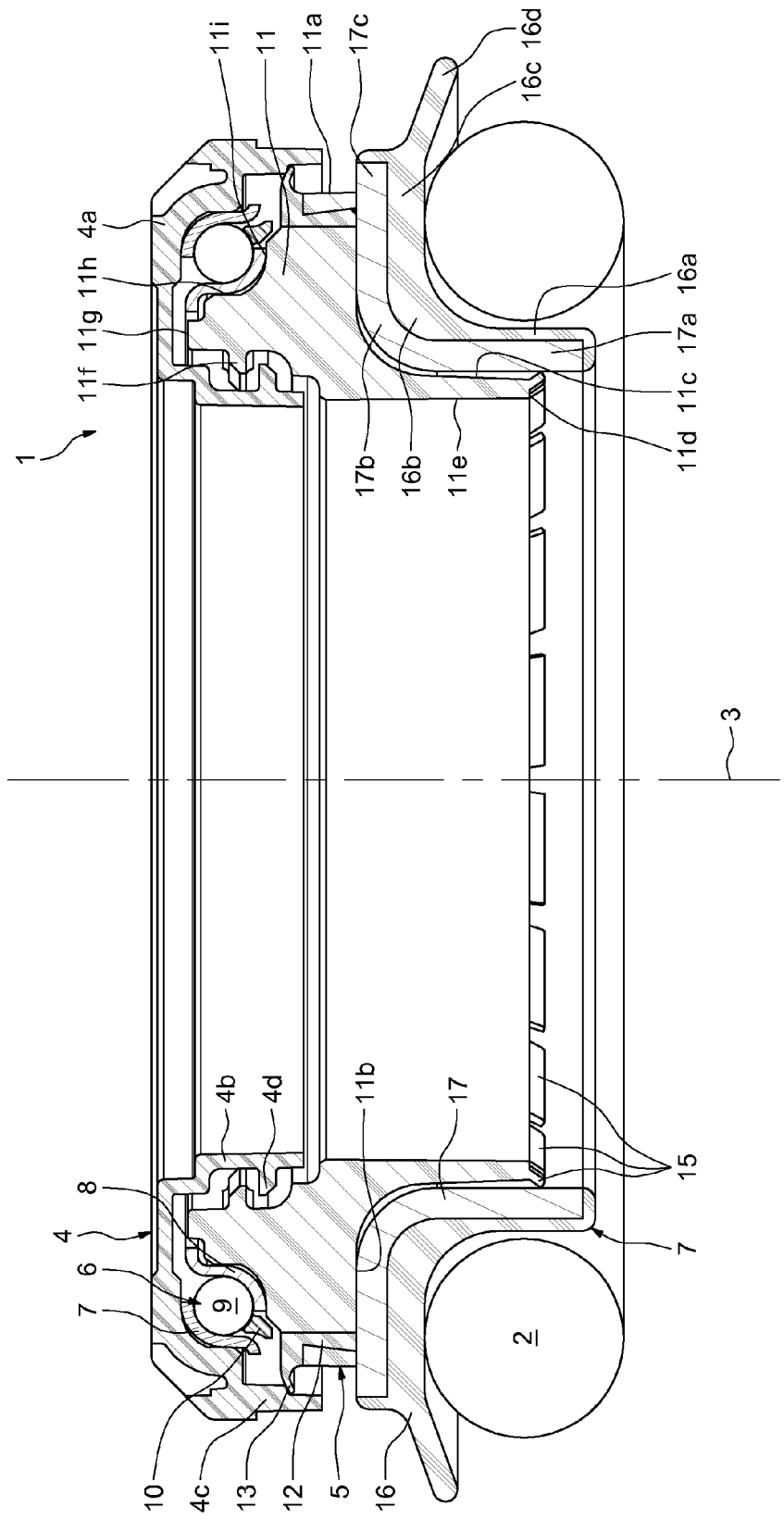
FIG. 1 is a view in axial section of a bump stop device according to a first embodiment of the invention.
Figure 2:
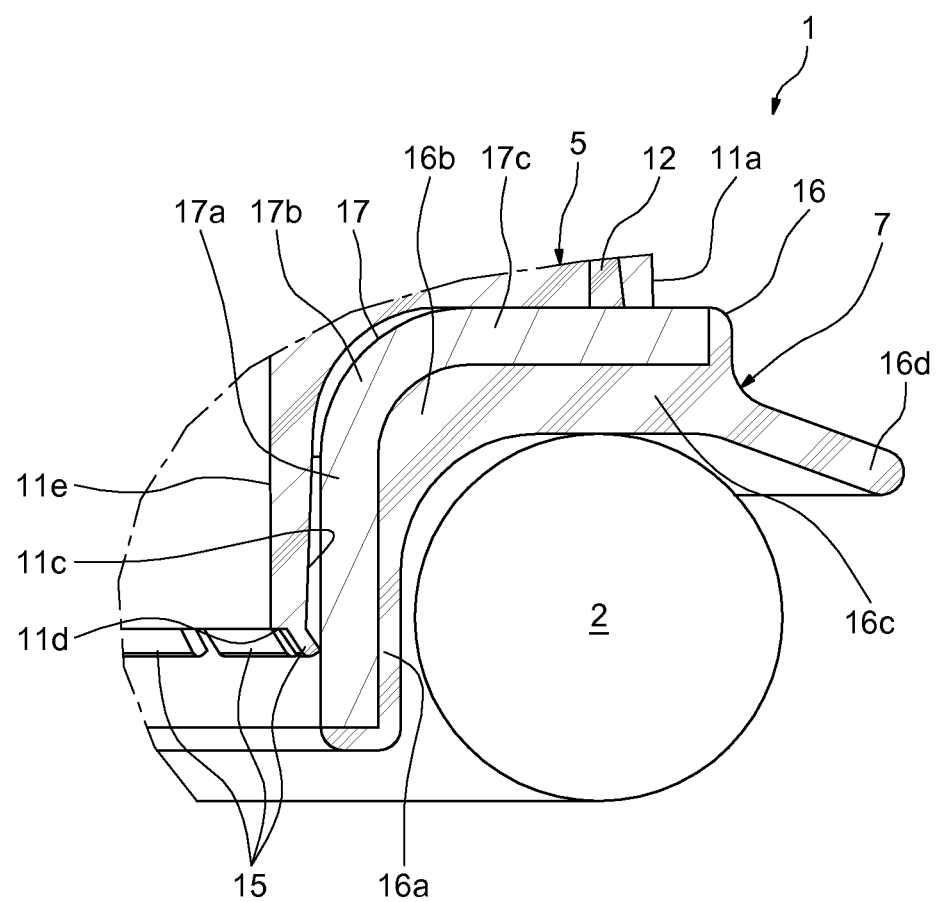
FIG. 2 is a detail view of FIG. 1.

FIGS. 1 and 2 show a bump stop device, indicated by the general reference number 1, and designed to be installed between a top retainer seat (not shown) capable of resting, directly or indirectly, in an element of a chassis of the motor vehicle, and a helical spring 2. The bump stop 1 is placed around a shock absorber rod (not shown) extending on a substantially vertical axis 3, the spring 2 being installed around the said rod.

The bump stop 1 mainly comprises a top support cover 4, a bottom support cover 5, a bearing 6 placed axially between the said covers, and a bottom retainer 7 for the spring 2.

The top cover 4 may consist of a one-piece part made of a plastic material, for example of polyamide PA 6.6 which may or may not be reinforced with glass fibres. The top cover 4 comprises a top radial portion 4a designed to be in contact with the top retainer seat, an annular internal axial skirt 4b that is thin and of small diameter, and an annular external axial skirt 4c that is thin and of large diameter radially surrounding the internal skirt 4b. The internal axial skirt 4b and the external axial skirt 4c extend axially downwards from the radial portion 4a. A hook 4d, which may be continuous or discontinuous in the circumferential direction, is arranged on the external edge of the internal axial skirt 4b, at a distance from its bottom end. The hook 4d is directed radially outwards.

The bearing 6 is entirely placed radially between the axial skirts 4b and 4c of the top cover 4. It comprises a top race 7 made of pressed metal sheet, a bottom race 8 also made of pressed metal sheet, and an array of rolling elements 9 in this instance made in the form of balls. The top race 7 is in contact with a bottom surface of the radial portion 4a of the top cover 4, and the bottom race 8 is in contact with a top surface of the bottom cover 5.

In order to make it possible to maintain an even circumferential spacing between the rolling elements 9, the bearing 6 also comprises a cage 10. The rolling elements 9 are placed between the toroidal raceways formed by the top race 7 and bottom race 8. Advantageously, the said races may be obtained from one and the same metal sheet blank by cutting and pressing, thanks to the fact that the external diameter of the top race 7 is substantially equal to the internal diameter of the bottom race 8.

The bottom support cover 5 comprises a body 11 made of plastic synthetic material, for example of the same material as the top cover 4. The body 11 has an external cylindrical surface 11a of small axial dimension from the bottom end of which a radial surface 11b extends stretching towards the inside via a rounded surface, then via an axial surface 11c.

From the bottom end of the axial surface 11c an annular radial surface 11d extends towards the inside. From the small-diameter edge of the radial surface 11d a stepped axial surface extends axially upwards forming a bore 11e of the bottom cover 5.

The stepped bore 11e comprises, in the vicinity of its top end, an annular radial rib 11f extending towards the inside in the direction of the internal skirt 4b of the top cover 4. The radial rib 11f has a radial bottom surface designed to interact with the hook 4d of the internal skirt 4b of the top cover 4, in order to interfere with the said hook 4d and to prevent a separation of the top cover 4 from the bottom cover 5 and from the bearing 6 before the bump stop 1 is installed between the top retaining seat and the spring 2. For this purpose, the radial rib 11f has a diameter that is smaller than that of the hook 4d so that a diametral interference can exist between the top cover 4 and bottom cover 5. The hook 4d therefore forms an axial retention means situated on the top cover 4 and interacting with a complementary axial retention means situated on the bottom cover 5, i.e. the radial rib 11f.

Furthermore, the hook 4d and the radial rib 11f form seals via narrow passageways in order to prevent the intrusion of foreign bodies or of various contaminating elements.

For this purpose, the stepped bore 11e extends axially to the vicinity of the bottom surface of the radial portion 4a so that a top radial surface 11g forms with the said surface a labyrinth protecting the bearing 6 from possible upwellings of water when the motor vehicle provided with such a bump stop 1 travels on a wet road.

From the small-diameter edge of the radial surface 11g, the body 11 comprises a stepped axial surface 11h, partly in contact with the bottom race 8, which is extended towards the inside via a rounded surface, itself extended via a radial surface 11i in contact with the said race 8.

The bottom support cover 5 also comprises a sealing boot 12 overmoulded onto the body 11 and extending inside the latter to the vicinity of the external surface 11a. The sealing boot 12 is provided with a relatively thin annular lip 13 extending radially in protrusion towards the outside and coming into friction contact with an internal edge of the external axial skirt 4c of the top cover 4. The lip 13 curves slightly downwards.

The sealing lip 13 makes it possible to prevent the intrusion of contaminating particles between the external axial skirt 4c of the top cover 4 and the external surface 11a of the bottom cover 5. The downward curvature of the sealing lip 13 is particularly advantageous to the extent that it increases its amplitude to repel possible splashes of water or of other contaminating particles. The lip 13 therefore forms a particularly effective deflector. In addition, when such splashes occur, the pressure of contact between the lip 13 and the top cover 4 increases, which further enhances its effectiveness.

As will be described in greater detail below, in order to allow the axial retention of the retainer 7, the bottom cover 5 comprises a plurality of elastic elements forming tongues 15. The tongues 15 are evenly distributed circumferentially and extend obliquely towards the outside from the radial surface 11d so as to rub against the retainer 7.

The bottom retainer 7 comprises a filtering element 16 made of a relatively flexible plastic synthetic material, for example of polyurethane or of nitrile rubber, and a metal stiffening strut 17 or insert made of steel to ensure sufficient rigidity for the subassembly thus formed. This subassembly allows a filtration of the vibrations and a good resistance to the forces exerted by the spring 3 by forming a means for absorbing and distributing the stresses pressing against the bottom cover 5.

The strut 17, of generally annular shape, is generally L-shaped in cross section. It comprises an axial portion 17a surrounding the axial surface 11c of the body 11 of the bottom cover 5, which is extended towards the outside from a top end via a rounded portion 17b substantially matching in shape the rounded portion connecting the surfaces 11b and 11c of the body 11. The portions 17a, 17b allow a slight radial clearance to remain between them and the bottom cover 5.

The rounded portion 17b is extended, from a large-diameter edge, radially towards the outside via a radial portion 17c in contact against the radial surface 11b of the bottom cover 5 and its free end protrudes relative to the cylindrical surface 11a. The strut 17 may for example be obtained from a metal sheet blank by cutting and pressing.

The filtering element 16 comprises, for its part, an axial portion 16a resting against the axial portion 17a of the strut 17, itself extended at a top end via a rounded portion 16b also in contact against the rounded portion 17b, and a radial portion 16c extending the rounded portion 16b and coming into contact against the radial portion 17c of the strut 17. The filtering element 16 also comprises a collar forming a lip 16d extending, from the radial portion 16c, radially towards the outside until it is situated radially beyond the last coil of the spring 3. More precisely, the lip 16d extends obliquely downwards so as to increase its ability to repel possible splashes of water or of other contaminants.

The filtering element 16 and the strut 17 are in contact with one another, the strut 17 resting on the body 11 of the bottom cover 5. The stiffening strut 17 is therefore placed axially between the filtering element 16 and the bottom cover 5. Advantageously, the vibration-filtering element 16 is overmoulded onto the stiffening strut 17, these two elements therefore being secured to one another. Naturally, it is possible to devise other methods of connection between the filtering element 16 and the strut 17, for example by bonding or by using mechanical connection means. In this case, the filtering element is manufactured separately by moulding and is then installed on the strut 17.

In this embodiment, the axial portion 16a of the filtering element 16 allows the spring 3 to be centred, while the radial portion 16c arranges a bearing surface for the said spring. On the matter of the axial portion 17a, the latter allows the subassembly to be centred around the surface 11c of the body 11 of the bottom cover 5. Specifically, the axial portion 17a delimits internally a bore inside which the bottom cover 5 is partly housed. The radial portion 17c makes it possible to transmit the axial forces between the spring 3 and the bottom cover 5 without concentrations of excessive stresses on the said cover.

This embodiment is advantageous to the extent that the suspension spring 3 rests directly against the filtering element 16 which makes it possible to obtain a good filtration of the vibrations. However, as a variant, it is also possible to invert the relative position of the filtering element 16 and of the stiffening strut 17 so that the filtering element 16 is placed axially between the stiffening strut 17 and the body 11 of the bottom cover 5. In another variant, it might also be possible to provide a retainer 7 consisting only of the strut 17.

As indicated above, the bottom cover 5 comprises a ring of elastic tongues 15 extending obliquely towards the outside in order to come into contact with the axial portion 17a of the strut 17 of the retainer 7. They are slightly inclined or curved downwards in the direction of the bottom end of the retainer 7. The tongues 15 originate from the bottom radial surface 11d, adjacent to one another and obtained by cutting a plurality of notches so as to have a certain axial elasticity. The tongues 15 interfere radially in an elastic manner with the bore of the retainer 7 in order to obtain an effective hold of the said retainer against the bottom cover 5. For this purpose, the diameter of the notional circle which envelops the ends of the tongues 15 is greater than the diameter of the bore of the strut 17 so as to ensure the interference necessary for the axial retention of the retainer 7 against the bottom cover 5. This ensures their bracing on the retainer 7 and the axial securing of the said retainer with the bottom cover 5.

The tongues 15 are in friction contact with the bore of the retainer 7 while remaining axially at a distance from the bottom end of the axial portions 16a and 17a of the filtering element 16 and of the strut 17. The tongues 15 are therefore offset axially upwards, i.e. in the direction of the bearing 6 and of the top cover 4, relative to the bottom end of the retainer 7. The tongues 15 are axially set back towards the inside relative to the bottom end of the retainer 7. The tongues 15 are therefore situated axially at a distance from the bottom end of the retainer 7. The tongues 15 are situated here substantially axially half way up the axial portion 17a of the strut 17.

The axial securing of the retainer 7 and of the bottom cover 5 is obtained by radial interference between the elastic tongues 15 and the bore of the retainer 7, which makes it possible to obtain an effective hold with no clearance while reducing the axial dimension of the bottom cover 5 supporting the bearing. The bottom cover 5 in this instance has a reduced dimension and a reduced weight.

Figure 3:
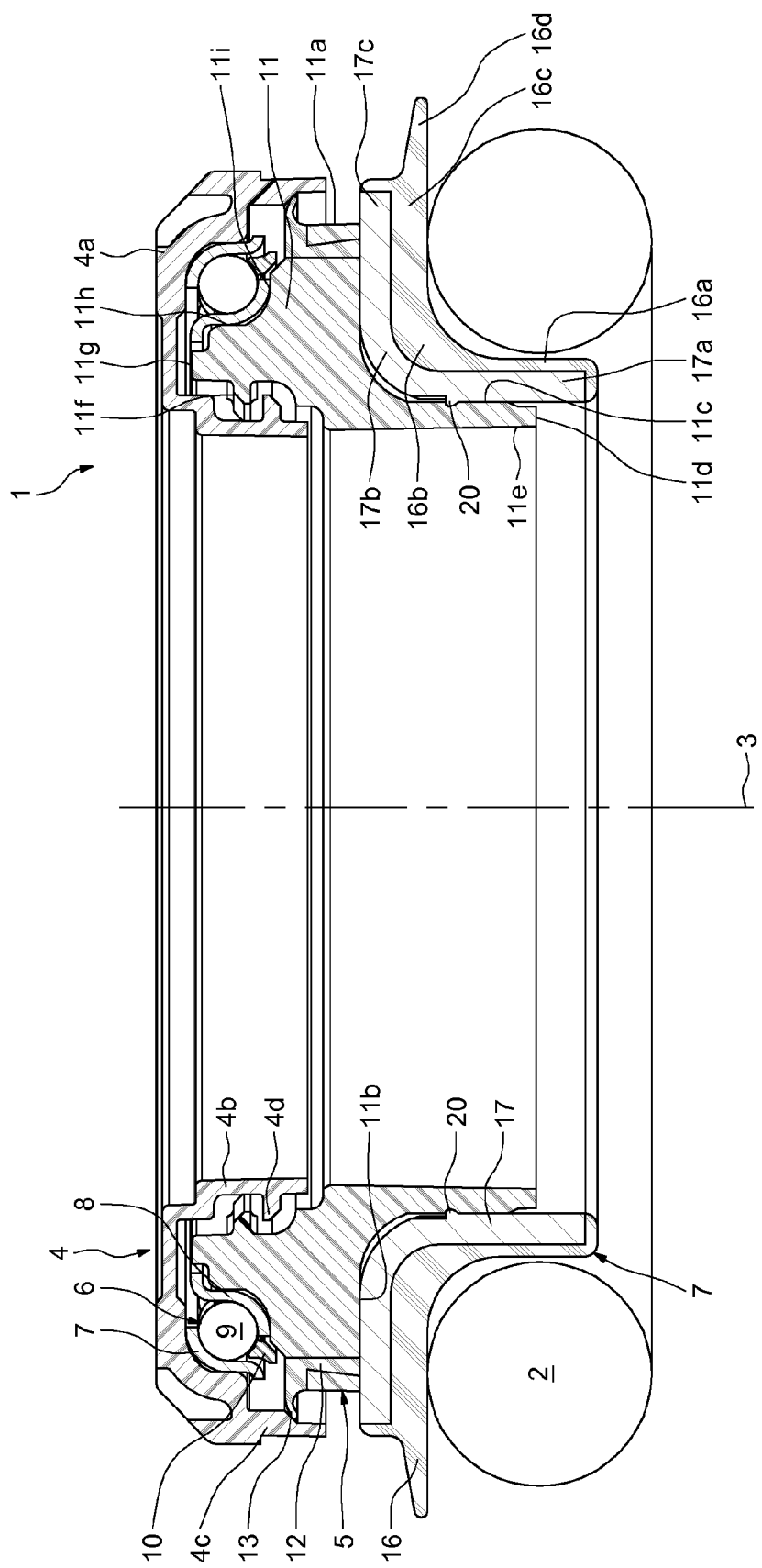
FIG. 3 is a detail view in axial section of a bump stop device according to a second embodiment of the invention.
Figure 4:
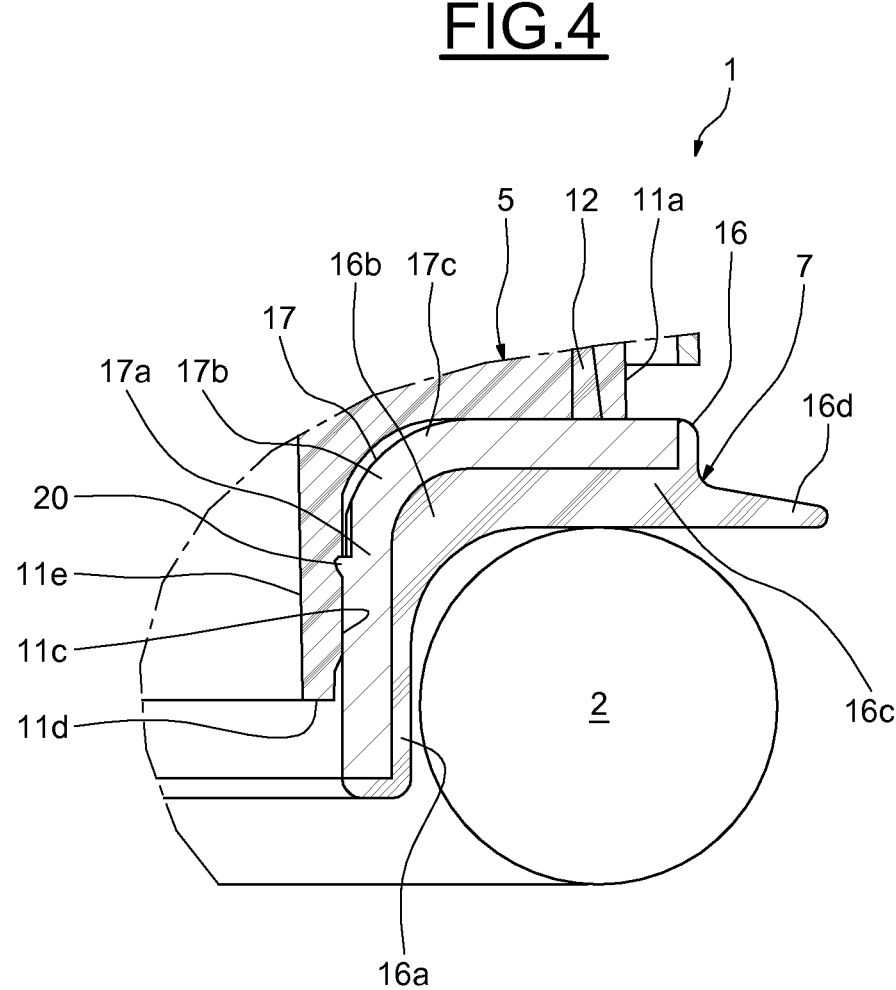
FIG. 4 is a detail view of FIG. 3.

The embodiment illustrated in FIGS. 3 and 4 in which the identical elements bear the same references differs from the embodiment described above only in that the means provided for allowing the axial securing between the bottom cover 5 and the retainer 7 is placed on the said retainer. The strut 17 of the retainer 7 in this instance comprises lugs 20 provided on the bore of the axial portion 17a and extending radially towards the inside in the direction of the external axial surface 11c of the bottom support cover 5. More precisely, the lugs 20 are situated axially in the vicinity of the rounded portion 17b of the strut 17. They are spaced evenly in the circumferential direction and form elements that protrude relative to the bore of the axial portion 17a so as to be able to be inserted by force into the body 11 made of synthetic material in order to ensure the axial retention of the retainer 7 on the bottom cover 5.

Therefore, a diametral interference is obtained by deformation between the lugs 20 and the bottom cover 5, which makes it possible to achieve the axial securing of these two elements. In this embodiment, the lugs 20 are circularly discontinuous. However, as a variant, it is possible to provide a single circularly continuous protrusion 20 arranged on the bore of the axial portion 17a of the strut 17.

Figure 5:
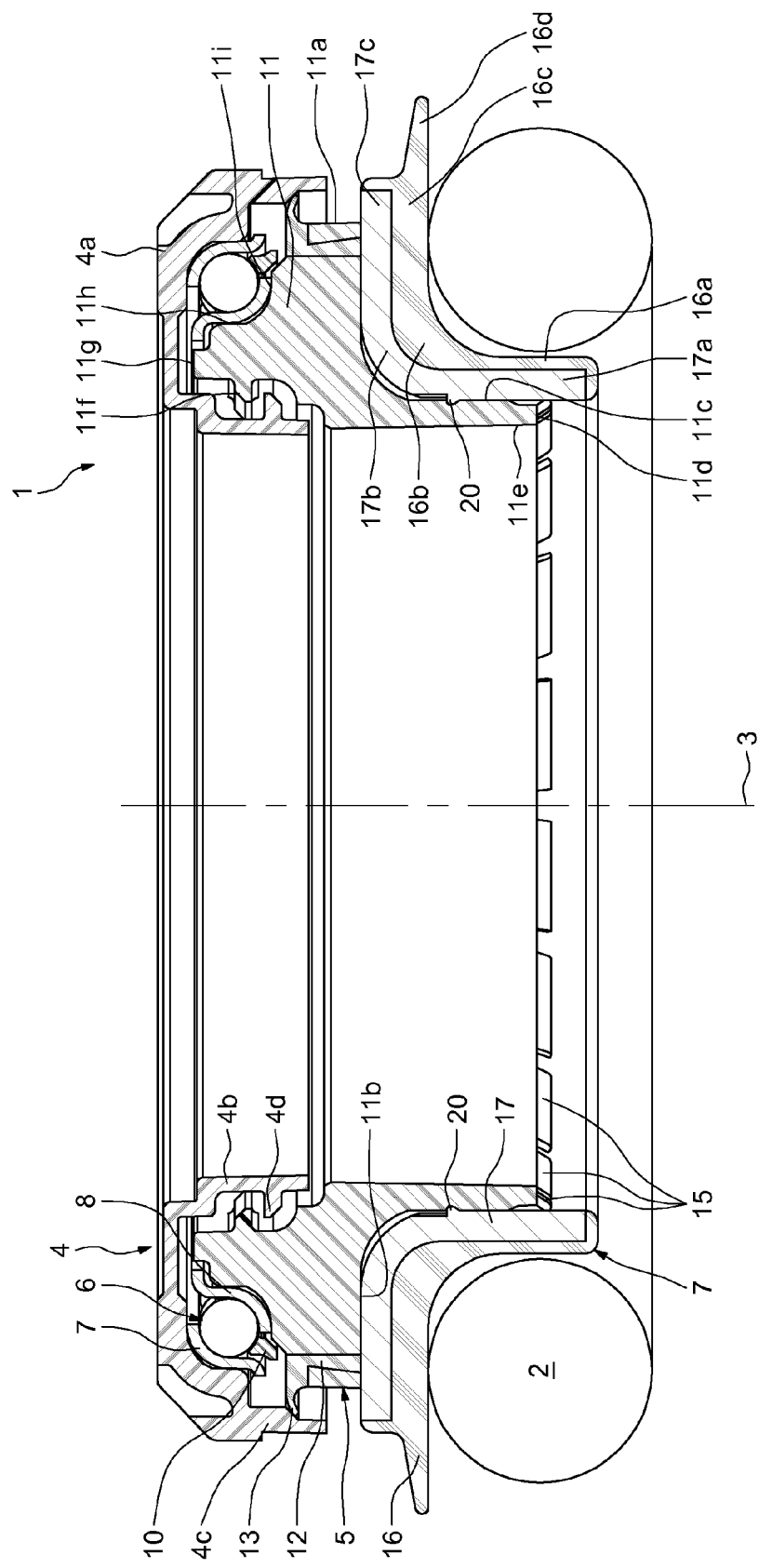
FIG. 5 is a detail view in axial section of a bump stop device according to a third embodiment of the invention.

Although, in the two embodiments described above, the means for axially securing the retainer 7 and the support cover 5 is provided either on the said cover or on the retainer, it is easily conceivable that it is also possible, without departing from the context of the present invention, to provide an axial securing means on each of these two elements as is illustrated in FIG. 5 in which the identical elements bear the same reference numbers. Specifically, in this variant embodiment, the bottom cover 5 comprises the tongues 15 designed to interact with the bore of the axial portion 17a of the strut 17, and the retainer 7 comprises the lugs 20 arranged on the said axial portion 17 while being situated axially above the tongues 15 and interfering with the bottom support cover 5.

Thanks to the invention, a bump stop device is obtained comprising a bottom support cover for a bearing and a bottom retainer for a spring, in which the connection between these two elements is achieved in a particularly simple, effective and economical manner and without the need for additional parts. This provides a subassembly that is easy to assembly, to transport and to handle during the operations of final installation on the suspension device with a relatively limited risk of axial separation of the elements forming it.

The invention claimed is:

1. A bump stop device for a motor vehicle, the device comprising:
   a bearing forming an axial stop,
   a bottom support cover of the bearing, and
   a bottom retainer for a spring, the retainer including at least one stiffening strut, wherein
   at least one of the bottom support cover and the bottom retainer includes at least one axial securing member (15, 20) configured to couple the retainer and the support cover, the at least one axially securing member being spaced axially inwardly from a bottom end of the retainer, and wherein
   a diametral interference is obtained by deformation of the axial securing member and at least one of the support cover and bottom spring retainer.

2. The device according to claim 1, wherein the at least one axial securing member includes a radially-extending protrusion.

3. The device according to claim 1, wherein the bottom retainer has a bore and the support cover includes a plurality of circumferentially spaced elastic members providing the at least one axially securing member, each of the support cover elastic members being radially deflectable into contact with a bore of the bottom retainer.

4. The device according to claim 3, wherein the plurality of elastic members have a free-state diameter that is greater than the diameter of the bore of the bottom retainer.

5. The device according to claim 3, wherein each of the elastic members extend obliquely in the direction of the bottom end of the retainer.

6. The device according to claim 1, wherein the bottom support cover has an external surface and the bottom retainer has a plurality of circumferentially spaced lugs radially deflectable into contact with the external axial surface of the bottom support cover.

7. The device according to claim 1, wherein the bottom support cover includes a body formed of a synthetic material.

8. A MacPherson strut comprising:
a shock absorber, and
a bump stop device including:
- a bearing forming an axial stop,
- a bottom support cover of the bearing, and
- a bottom retainer for a spring, the retainer including at least one stiffening strut,
- wherein at least one of the bottom support cover and the bottom retainer includes at least one axial securing member configured to couple the retainer and the support cover, the at least one axially securing member being spaced axially inwardly from a bottom end of the retainer.

9. A motor vehicle comprising at least one MacPherson strut, the strut including:
a shock absorber, and
a bump stop device including:
- a bearing forming an axial stop,
- a bottom support cover of the bearing, and
- a bottom retainer for a spring, the retainer including at least one stiffening strut,
- wherein at least one of the bottom support cover and the bottom retainer includes at least one axial securing member configured to couple the retainer and the support cover, the at least one axially securing member being spaced axially inwardly from a bottom end of the retainer, and wherein
a diametral interference is obtained by deformation of the axial securing member and at least one of the support cover and bottom spring retainer.

* * * * *